Inventor:
Joseph F. Loch
by T G Dupont
His Attorney

April 23, 1963   J. F. LOCH   3,086,511
COOKING APPLIANCE
Filed Jan. 8, 1962   3 Sheets-Sheet 3

Inventor:
Joseph F. Loch
by T G Dysart
His Attorney

United States Patent Office 3,086,511
Patented Apr. 23, 1963

3,086,511
COOKING APPLIANCE
Joseph F. Loch, Allentown, Pa., assignor to General Electric Company, a corporation of New York
Filed Jan. 8, 1962, Ser. No. 164,773
8 Claims. (Cl. 126—335)

This invention relates to cooking appliances, and more particularly to a cooking appliance including a door actuated food supporting rack located in the cooking chamber.

The general object of the present invention is to provide a cooking appliance having an improved linkage arrangement interconnecting a movable food rack in the cooking chamber and the door so that the food rack is moved forwardly through the door opening when the door is opened.

Another object of the invention is to provide a cooking appliance of the foresaid character in which the food rack is so interconnected with the door that its rate of forward movement progressively increases as the door opens and a major portion of its movement takes place after the door is more than halfway open.

Another object of the invention is to provide a cooking appliance including a pivotally mounted door so arranged that it opens upwardly and moves in almost a vertical plane between closed and opened positions.

Briefly stated, in accordance with one aspect of this invention there is provided a cooking appliance including walls forming a cooking chamber having a front opening, a door for the opening mounted on arms pivotally supported on the walls and a horizontal food supporting rack mounted in the cooking chamber on generally vertical links which are pivotally mounted so that the rack can move forwardly through the door opening. The door supporting arms and the rack supporting links are interconnected by a pin-and-slot arrangement which causes the rack to move forwardly throughly the door opening as the door opens. The slot is so shaped and located that the rack moves forward slowly during the initial opening movement of the door and completes its movement after the door is more than halfway open.

The subject matter which I regard as my invention is particularly pointed out and distinctly claimed in the concluding portion of this specification. However, the organization and method of operation of the invention, together with further objects and advantages thereof, may be best understood by reference to the following description taken in connection with the accompanying drawings in which:

Figure 1:
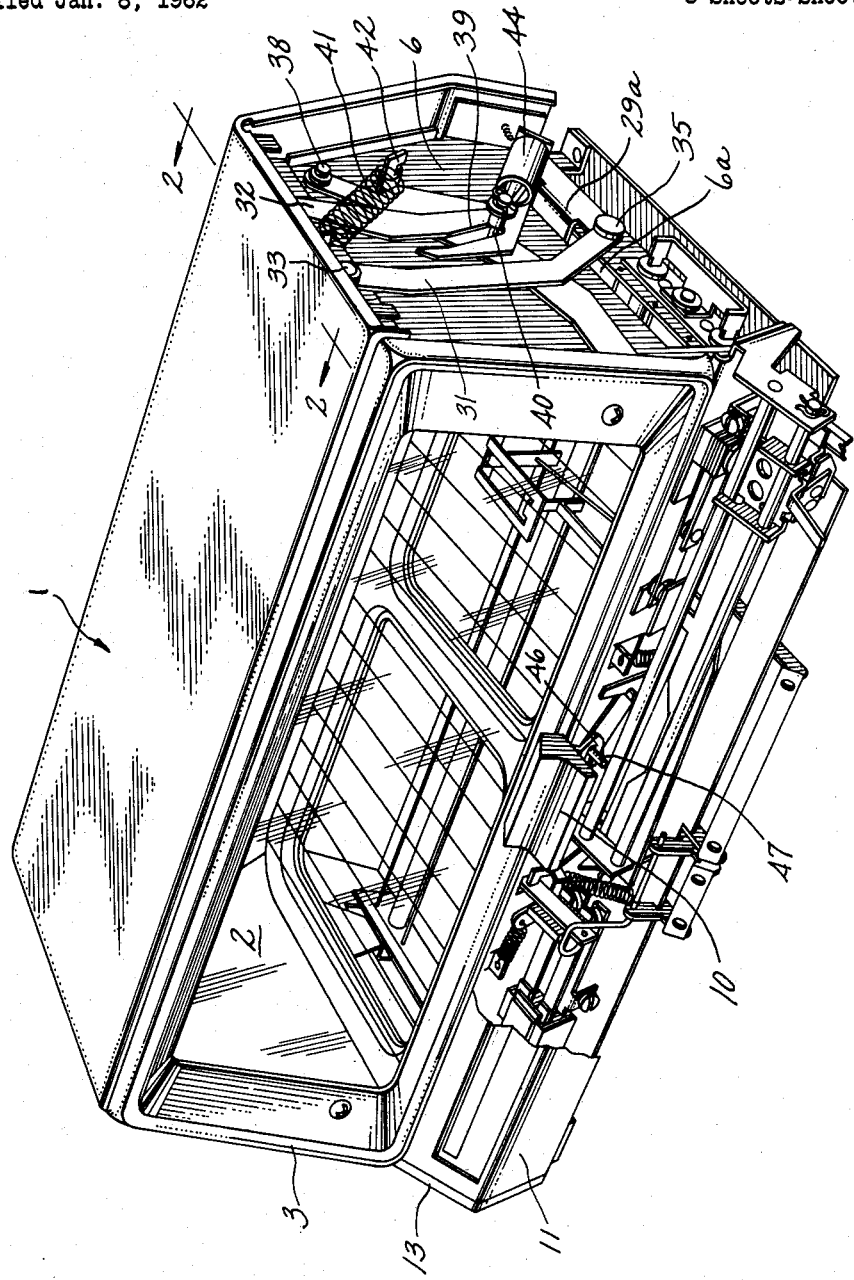
FIG. 1 is a perspective view of a cooking appliance embodying my invention, some of the parts being removed or broken away to show details of construction.

Referring to the drawings, the numeral 1 generally designates a portable cooking appliance having a cooking chamber 2 therein provided with a front opening in which a door 3 is mounted. Door 3 is preferably provided with a heat resistant glass window 4 so that the interior of the cooking chamber can be observed during cooking operations. Cooking chamber 2 is formed by a pair of side walls 5 and 6, top wall 7, bottom wall 8 and rear wall 9, all of which are preferably formed from sheet metal. Extending forwardly from the plane of door 3 and immediately below door handle 10 secured thereto is a protruding wall member 11 forming a compartment in which various control components are located. As shown in FIG. 1, walls 7, 8 and 9 extend outwardly beyond side walls 5 and 6, thus providing space for a door and food supporting rack linkage arrangement to be described below. A pair of end closure members 12 and 13, which are preferably made of a molded plastic material, are secured to the respective extending end portions of walls 7, 8 and 9 so as to completely enclose the aforesaid linkage arrangement. End enclosure member 12 is formed with a handle portion 14 and feet 15 and of course closure member 13 is formed in a similar manner.

Figure 2:
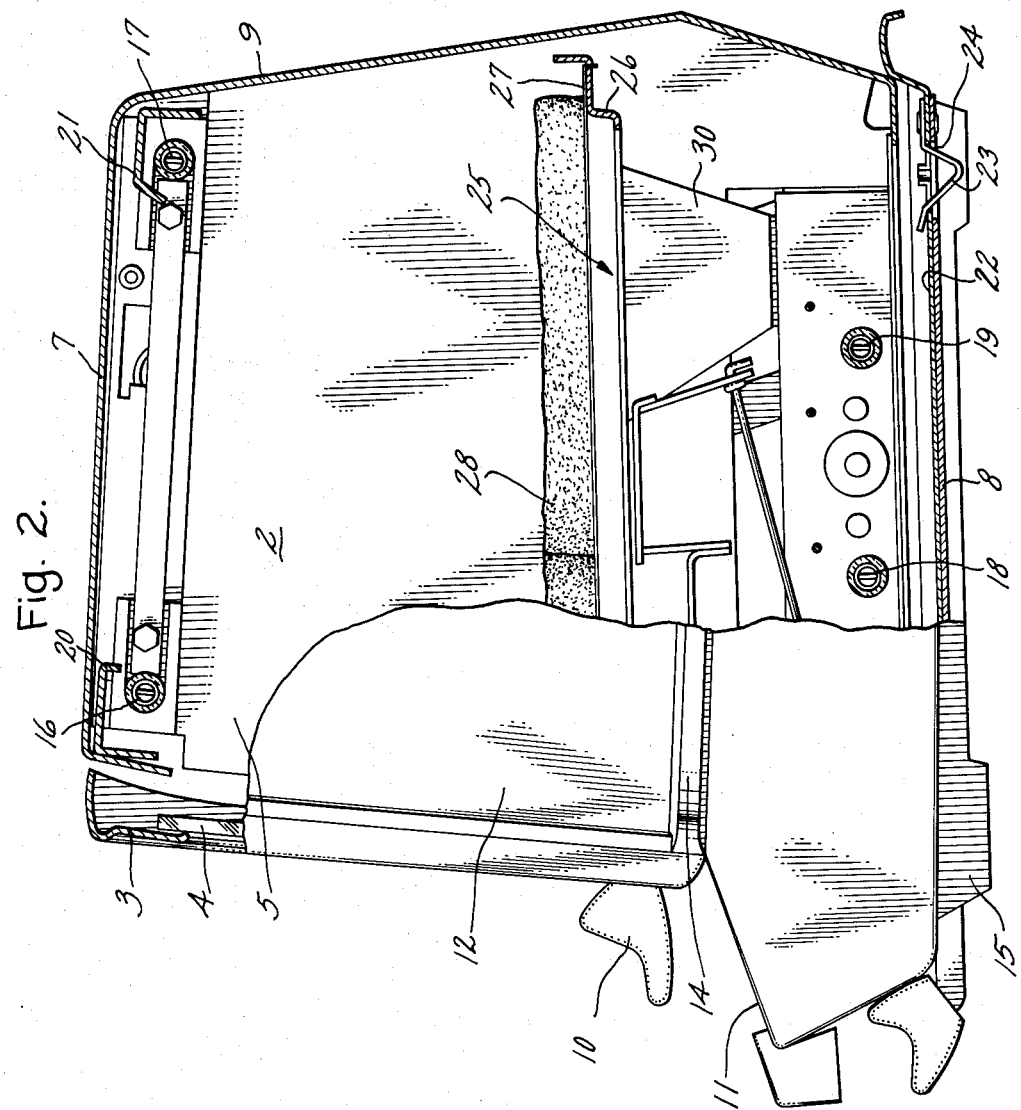
FIG. 2 is an enlarged cross-sectional view taken generally along the line 2—2 in FIG. 1.

Mounted within cooking chamber 2 adjacent top wall 7 are a pair of electric heating elements 16 and 17 and a similar pair of electric heating elements 18 and 19 are mounted adjacent bottom wall 8. Heating units 16, 17, 18 and 19 are formed from coiled resistance wire enclosed within an elongated quartz tubular member and extend substantially the entire width of the cooking chamber. The heating elements are supported in fixed relation to walls 5 and 6 and their terminals extend therethrough. Thus the electrical wiring for supplying current to the heating units may be located in the enclosed space between end wall 6 and enclosure 12 and between end wall 5 and end closure 13. Heating units 16 and 17 are arranged to radiate heat downwardly into the cooking chamber 2 and accordingly elongated reflectors 20 and 21 are mounted in the upper portion of the chamber adjacent top wall 7 as shown in FIG. 2. Reflectors 20 and 21 extend along substantially the entire width of the cooking chamber and cooperate with heating elements 16 and 17, respectively. Heating elements 18 and 19 function to radiate heat upwardly into the cooking chamber, and are aided in this respect by a combination reflector and crumb tray 22 which is removably supported on bottom wall 8. Preferably a spring latch 23 is mounted on crumb tray 22 so as to cooperate with an aperture 24 in the bottom wall 8 so that it is releasably retained in the position shown in FIG. 2.

A horizontal food suporting rack 25 is positioned in cooking chamber 2 in an intermediate location between upper heating units 16 and 17 and lower heating units 18 and 19. In order to permit articles of food supported on rack 25 to be heated from the bottom as well as the top the rack comprises a rectangular frame 26 and a plurality of parallel lengths 27 of stainless steel wire secured under tension to the front and rear edges of the rack. Thus when a slice of bread or the like 28 is being toasted, as illustrated in FIG. 2, its bottom surface is exposed to radiation from heating elements 18 and 19, and receiving substantially the same amount of radiation as does the top surface from heating elements 16 and 17.

In accordance with the present invention, food rack 25 is mounted in chamber 2 for forward movement through the front opening thereof and is interconnected with door 3 so that opening movement of the latter causes forward movement of the rack. Referring to FIG. 1, the side edges of food rack 25 adjacent end walls 5 and 6 are provided with supporting members 29 and 30 extending downwardly therefrom. While only the righthand rack supporting arrangement shown in FIG. 1 will be described in detail, it will be understood that the left side of rack 25, as viewed in FIG. 1, is supported in a substantially similar manner. Supporting member 29 includes a horizontally extending portion 29a arranged to extend through a slot 6a which extends horizontally adjacent the lower edge of end wall 6. Portion 29a of support member 29 is arranged to move horizontally within slot 6a and is supported on a pair of generally parallel links 31 and 32. Link 31 is pivotally mounted at its upper end with respect to end wall 6 by means including a pivot pin 33 while link 32 is pivotally mounted at its upper end by means including a pivot pin 34 secured to the end wall structure in laterally spaced relationship to pivot pin 33. Similarly, the lower end of link 31 is pivotally secured to supporting member 29a by pivot pin 35 while the lower end of link 32 is pivotally secured to support member 29a by a pivot pin 36 which is laterally spaced with respect to pivot pin 35. Thus food rack 25 may be moved from its position within the cooking chamber, shown in FIG. 3 to its forwardly extending position shown in FIG. 4, and by virtue of the pivoted linkage supporting arrangement it moves in substantially a horizontal plane.

Figure 3:
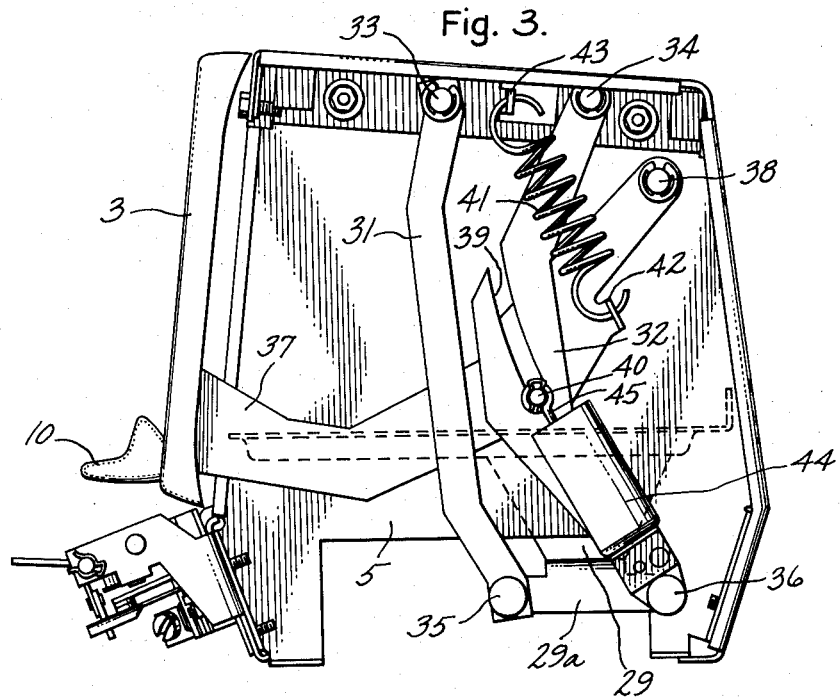
FIG. 3 is a side elevation view of the cooking appliance, some of the parts being broken away or removed to show details of construction.
Figure 4:
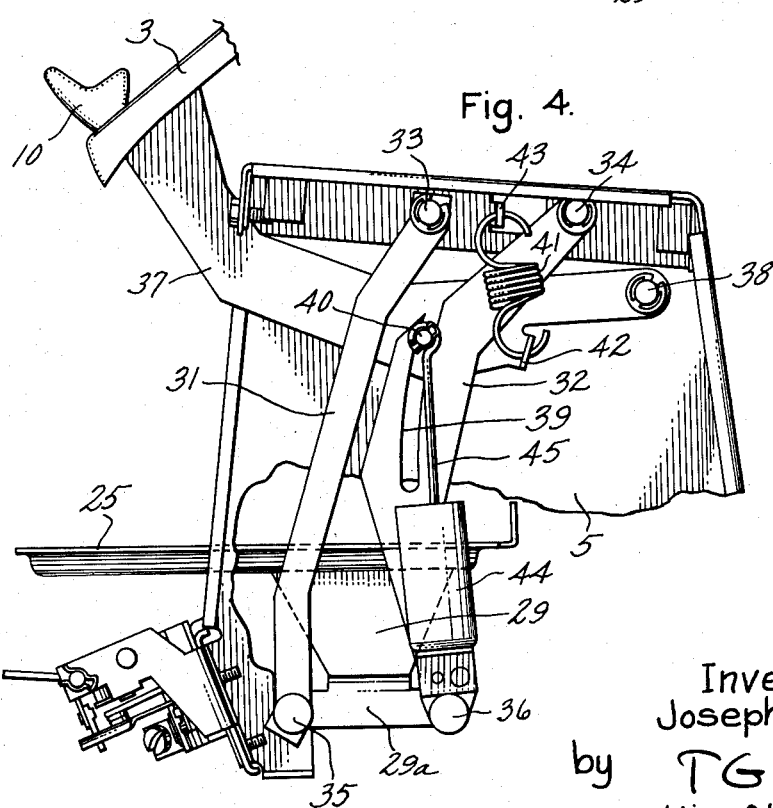
FIG. 4 is similar to FIG. 3 but shows the parts in a different position.

Door 3 is supported on the wall structure of cooking appliance 1 by means of a pair of rearwardly extending hinge arms 37 secured to the side edges of the door located in the space between end closure 13 and end wall 5 and the space between end closure 14 and end wall 6 respectively. As shown in FIGS. 3 and 4, hinge arm 37 is pivotally mounted at the upper rear portion of side wall 6 by means of a pivot pin 38, the axis of which is parallel to the axes of pivot pins 33 and 34. Thus in moving from the closed position shown in FIG. 3 to the open position shown in FIG. 4, door 3 moves in a wide arc which is almost vertical and its path of movement extends only a very short distance in front of the forwardmost portion of the cooking appliance thereby minimizing the possibility of contact with articles resting on the table top close by. As previously mentioned, door 3 and rack 25 are interengaged so that opening movement of the door causes the rack to move forwardly. This is accomplished by providing a curved slot 39 in link 32 and securing a pin 40 on arm 37 arranged to ride in slot 39. As the door 3 is opened pin 40 engages the forward edge of slot 39, as viewed in FIGS. 3 and 4, and causes link 32 to move forwardly. This movement is of course transmitted to rack 25 which is pivotally supported by link 32 as well as link 31. Door 3 is biased to its open position by a coil spring 41 secured at one end to a lug 42 on arm 37 and at its other end to a lug 43 carried by the end structure of the appliance. In order to limit the rate of opening movement of the door, a dash-pot 44 is pivotally secured at one end to pivot pin 36 with its plunger rod 45 pivotally secured to pin 40. It will be understood that dash-pot 44 is of conventional design and functions to resist rapid movement of door 3 during opening. It will also be understood that door 3 is retained in its closed position by a releasable latch arrangement including, for example, a catch 46 secured to door 3 and a movable latch pin 47 (see FIG. 1).

The curved shape of slot 39, its generally vertical position and the orientation and spacing of the various pivot pins on which arm 37 and links 31 and 32 are mounted brings about a desirable ratio of door movement to rack movement which assures that the lower edge of the door will not interfere with outward movement of relatively thick food products such as meat pies and loaf cakes. In other words, the arrangement shown in FIGS. 3 and 4 assures that door 3 initially moves rapidly in opening while the rack moves forward relatively slowly at first and completes approximately one-half of its movement after the door is two-thirds open.

It will be understood that a suitable latch releasing arrangement is provided to release latch pin 47 from door catch 46 so that door 3 may be moved from the closed position shown in FIG. 3 to the open position shown in FIG. 4. Preferably, the latch releasing mechanism is either manually operable or automatically operable, under the control of a heat responsive device 48, for example, so that door 3 will open automatically at the end of a toasting operation. The details of such a latch releasing arrangement do not form a part of the present invention, and therefore they will not be described in detail. One such latch releasing arrangement which may be utilized is disclosed and claimed in application Serial No. 164,774, filed January 8, 1962, by Joseph F. Loch et al., and assigned to the assignee of the present application.

In operation, it will be understood that door 3 and rack 25 occupy the position shown in FIG. 3 during cooking operations. In this closed position of door 3 spring 41 is extended, and upon release of latch pin 47 from door catch 46 the spring causes door 3 to move to its open position shown in FIG. 4. As door 3 is opened by spring 41 dash-pot 44 functions to regulate its rate of movement and rack 25 simultaneously moves forwardly through the door opening since pin 39 carried by arm 37 is in engagement with slot 39 in rack link 32. As previously described, rack 25 completes the major portion of its movement after door 3 is more than half-way open and thus door 3 does not interfere with outward movement of relatively tall food products resting on rack 25. Also, the forwardmost edges of door 3 and door handle 10 move in a wide arc which approximates a generally vertical line of movement, and thus any articles which may be resting directly in front of cooking appliance 1 will not interfere with opening movement of the door. Whenever door 3 is shifted from the open position shown in FIG. 4 to the closed position shown in FIG. 3 pin 40 engages the rear surface of slot 39, thus causing rack 25 to retract within cooking chamber 2 as the door closes.

As previously indicated, the left ends of door 3 and rack 25 (as viewed in FIG. 1) are supported by an arm and linkage arrangement substantially identical to the arm and linkage arrangement supporting the right ends of the door and rack, described above. However, only one dash-pot 44, which may be located on the right side of the cooking appliance, as shown in FIG. 1, is required.

While I have disclosed a particular embodiment of my invention, I do not desire the invention to be limited to the specific construction disclosed, and I intend by the appended claims to cover all modifications within the true spirit and scope of the invention.

What I claim is:

1. A cooking appliance comprising wall means forming a cooking chamber having a front opening, a door for closing said opening movable between a closed position and an open position, an arm secured to said door adjacent the lower edge thereof and extending toward the rear of said chamber adjacent one side thereof, pivot means supporting the end of said arm on said wall means, said pivot means being vertically spaced from the portion of said arm attached to said door to permit movement of said door from said closed position to said open position, a pair of generally vertical links pivotally mounted at their upper ends to said wall means adjacent the upper portion of said chamber, the pivotal axes of the upper ends of said links being parallel to each other and to the axis of said pivot means, a horizontal food supporting rack mounted in said chamber for forward movement through said front opening, said rack being pivotally mounted on the lower ends of said links, the pivotal axes of the lower ends of said links being parallel to each other and to the axis of said pivot means, and pin-and-slot means connecting said arm and one of said links for moving said rack through said front opening when said door moves to its open position.

2. A cooking appliance as defined in claim 1 in which the slot of said pin-and-slot means is curved and extends generally vertically.

3. A cooking appliance as defined in claim 1 including spring means biasing said door to its open position, latch means for releasably latching said door in its closed position, and dash-pot means for limiting the rate of movement of said door from closed to open position.

4. A cooking appliance as defined in claim 1 in which said pivot means supporting the end of said arm is located adjacent the rearmost portion of said cooking chamber and said door moves upwardly from its closed position to a raised open position, the path of movement of the lower edge of said door being a generally vertical arc.

5. A cooking appliance comprising wall means forming a cooking chamber having a front opening, said wall means including a first side wall and a second side wall, a top wall, a rear wall and a bottom wall, a door for said opening, said top, rear and bottom walls extending beyond said side walls in overhanging relation thereto, first and second end closures secured to the side edges of said top, rear and bottom walls in parallel relation to said first and second end walls respectively, first and second rearwardly extending laterally spaced arms secured to the side edges of said door, said first arm extending along the outside surface of said first side wall, said second arm extending along the outside surface of said second side wall, pivot means mounted in fixed relation to said wall means for mounting said arms for movement about a horizontal axis parallel to said door so that said door is movable between a lower closed position and a raised open position, a horizontal food supporting rack mounted in said chamber for movement forwardly through said front opening, first linkage means located between said first side wall and said first end closure for supporting one end of said rack, second linkage means located between said second side wall and said second end closure for supporting the other end of said rack, each of said linkage means including a pair of generally vertical links pivotally mounted at their upper ends to said wall means adjacent said top wall, the pivotal axes of the upper ends of said links being parallel to each other and to the axis of said pivot means, said rack being pivotally supported on the lower ends of said links being parallel to each other and to the axis of said pivot means, and pin-and-slot means connecting one of said arms and one of said links adjacent thereto for moving said rack through said front opening when said door moves to its open position.

6. A cooking appliance as defined in claim 5 including spring means biasing said door to its open position, latch means for releasably latching said door in its closed position, and dash-pot means for limiting the rate of movement of said door from closed to open position.

7. A cooking appliance as defined in claim 5 in which the slot of said pin-and-slot means is curved and extends generally vertically.

8. A cooking appliance as defined in claim 5 in which said pivot means are located adjacent the rear edge of said top wall, the path of movement of the lower edge of said door being a generally vertical arc.

References Cited in the file of this patent
UNITED STATES PATENTS

| | | |
|---|---|---|
| 1,262,659 | Foster | Apr. 16, 1918 |
| 1,958,348 | Raley | May 8, 1934 |
| 2,125,989 | Burch | Aug. 9, 1938 |
| 2,139,989 | Weiskittel | Dec. 13, 1938 |
| 2,139,990 | Weiskittel | Dec. 13, 1938 |
| 2,987,363 | Morse | June 6, 1961 |